United States Patent [19]
Jacoby et al.

[11] 3,840,893
[45] Oct. 8, 1974

[54] TRACK FOLLOWING SERVO SYSTEM

[75] Inventors: George Victor Jacoby, Holden; Sidney Perham Woodsum, Boston, both of Mass.

[73] Assignee: RCA Corporation, New York, N.Y.

[22] Filed: Nov. 2, 1972

[21] Appl. No.: 303,022

[52] U.S. Cl. .............................................. 360/77
[51] Int. Cl. .............................................. G11b 21/10
[58] Field of Search ............... 340/174.1 C, 174.1 B, 340/174.1 J; 179/100.2 S; 178/6.6 P; 360/77

[56] References Cited

UNITED STATES PATENTS

| | | | |
|---|---|---|---|
| 3,263,031 | 7/1966 | Welsh | 340/174.1 C |
| 3,404,392 | 10/1968 | Sordello | 340/174.1 B |
| 3,449,735 | 6/1969 | Cogar | 340/174.1 C |
| 3,474,432 | 10/1969 | Sevilla | 340/174.1 B |
| 3,479,664 | 11/1969 | Stuart-Williams et al. | 340/174.1 C |

OTHER PUBLICATIONS

Reproducing System for Transverse Track Tape, R. P. Auyang & E. J. Wroblewski, IBM Technical Bulletin Vol. 6, No. 12, May 1964, pg. 60.

Track Following Technique for Random Access Disk File, G. F. Abbott & H. H. Cockrell, IBM Technical Bulletin Vol. 12, No. 7, Dec. 1969, pg. 1115.

*Primary Examiner*—Bernard Konick
*Assistant Examiner*—Stewart Levy
*Attorney, Agent, or Firm*—R. E. Smiley; H. Christoffersen

[57] ABSTRACT

A movable member, such as a random access disc file, has signals impressed on a disc surface in the form of concentric tracks alternately recorded at first and second frequencies. A transducer assembly having two gaps, one gap offset from the other in a direction normal to the track direction, is employed to follow the track. Any difference in signal level at the track frequency, sensed at the two gaps, is converted to a drive signal for returning the assembly to a position centered over the track.

4 Claims, 9 Drawing Figures

TRACK FOLLOWING SERVO SYSTEM

BACKGROUND OF THE INVENTION

In bulk storage systems for binary data, such as magnetic disc systems, data is arranged in the form of concentric tracks on the several disc surfaces of a disc file. Then a block of data is accessed by supplying the track address of that data and developing from that address the control voltages necessary to move the transducer(s) (magnetic head or heads in the case of a disc) to the correct track on the disc. If the track spacing on the disc is relatively wide—for example, 100 tracks per inch—open loop control may be employed to coarse position the transducer—to move it close to the desired track and then a detent may be employed to fine position the transducer—to hold it centered on the track called for by the address. However, such arrangements are not sufficiently precise for systems where adjacent tracks are more closely spaced.

Systems of the latter kind require closed loop control. Some systems achieve this by employing a special servo head which follows a track with specially recorded information on the storage member. For example, the servo head may have to follow a track formed of high coercivity magnetic material and the data may have to be recorded on low coercivity material. Systems of this general kind are complex and costly.

SUMMARY OF THE INVENTION

A signal reception means having first and second pickup means is positioned adjacent a recording track having a signal impressed thereon on a movable member. The pickup means are offset from one another in a direction transverse to the track. A means for maintaining the signal reception means centered in the track comprises means for maintaining the signal reception means in a position such that equal signals are received from each pickup means.

BRIEF DESCRIPTION OF THE DRAWING

FIGS. 3*a* through 3*f* are schematic illustrations showing the different positions a head assembly can assume with respect to a selected disc track.

DETAILED DESCRIPTION

Figures 1, 2, 3:
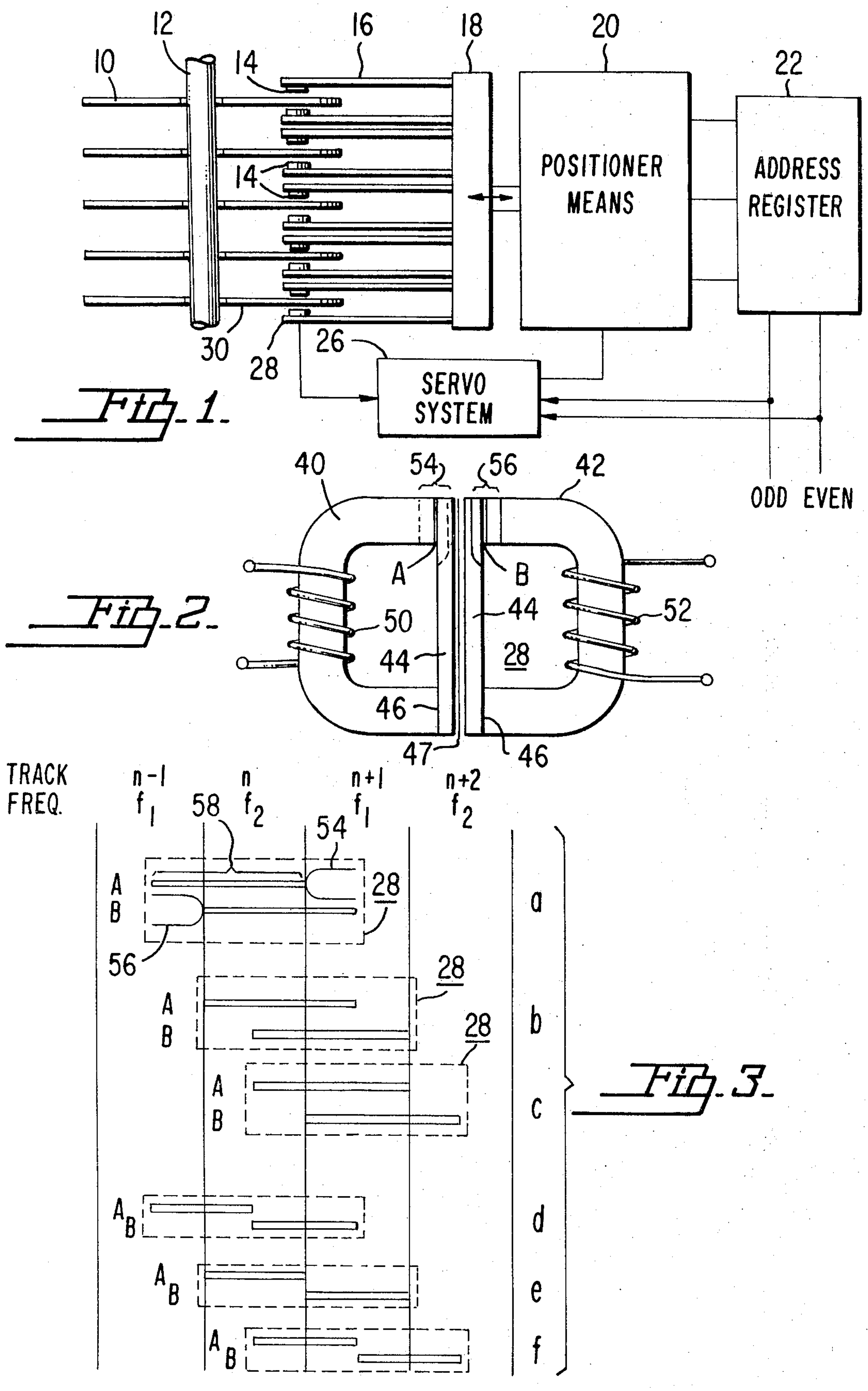
FIG. 1 is a schematic illustration of a disc recording system incorporating the present invention.
FIG. 2 is a cross section of a transducer head assembly used in connection with the disk system of FIG. 1.

The disc storage system shown in FIG. 1 includes a stack of recording discs 10 secured to a common shaft 12. The shaft 12 is driven by a conventional drive motor (not shown). Each disc 10 may be provided with upper and lower recording surfaces which most commonly are formed of magnetic material. It is to be understood, however, that the teachings of the present invention are also applicable to other recording materials such as, for example, thermoplastic materials. The invention also is applicable to linearly movable recording means such as, for example, magnetic tapes and drum systems.

A plurality of read-write transducers 14 (magnetic heads) are located with one next to each disc surface. Each transducer is carried by a different arm 16. The transducers 14 are all preferably in vertical alignment. The arms 16 are secured to a back bar 18 which is adapted to be moved by a positioner means 20 in a direction parallel to the disc surfaces and radially of the discs. That is, the positioner means 20 is able to position the back bar 18 at any one of a plurality of discrete distances from the shaft 12 to thus permit the heads 14 to be positioned over any one of a plurality of annular tracks defined on each of the disc surfaces. Positioner means 20 may be of the so-called voice call or linear motor type. Regardless of the type of positioner means 20 utilized, it is responsive to an address stored in address register 22. More particularly, a digital address which defines any one of a plurality of track positions can be stored in an address register 22.

The positioner means 20 in response to signals from the address register 22 positions the heads 14 in nominal alignment with the track identified by the digital information in the address register. The address register is comprised of a sufficient number of binary stages to permit selection of any one of the tracks. Thus, if 400 tracks are defined on each disc surface, then the address register must contain nine binary stages. The 400 tracks can be considered as being comprised of alternate odd and even tracks. The state of the least significant binary stage of the address register indicates whether an odd or even track is being selected.

The servo system 26 is for the purpose of precisely positioning the heads 14 over the center of a selected track. The servo system 26 is responsive to signals read by a transducer assembly 28 which is positioned proximate to a positioning surface 30 which is illustrated herein as the bottom surface of the lower disc 10. On a practical embodiment a center disc would be chosen to minimize tolerance buildups which are often more pronounced at the end discs. In response to information provided by transducer assembly 28 the servo system 26 is able to determine, in a manner to be described, whether the heads 14 are properly centered with respect to the tracks. In the event the heads are not properly positioned, the servo system 26 provides an error signal to the positioner means 20 in order to move the heads until the error is reduced to zero.

In FIG. 2, which is a view of transducer assembly 28 as viewed from shaft 12, the transducer is seen to comprise two C-shaped pole pieces 40 and 42, respectively, each joined to an I-shaped pole piece 44. The C-shaped pole pieces are mechanically connected to the pole piece 44 to provide a low reluctance path therewith at region 46. The opposite end of pole piece 40 is separated from pole piece 44 by a small gap labeled A, while pole piece 42 is separated from pole piece 44 by a small gap labeled B. These may be either physical gaps (air spaces) or gaps A and B may be filled with a nonmagnetic material to form high reluctance paths. A change in flux appearing at gap A is manifested as a signal change at coil 50, which surrounds pole piece 40. Likewise, a change in flux appearing at gap B appears as an electrical signal at coil 52, which surrounds pole piece 42. An eddy current shield 47 such as copper separates the two I-shaped pole pieces. The transducer assembly structure of FIG. 2 is configured as illustrated for reasons of mechanical convenience only. There is essentially no interaction between the signals appearing at coils 50 and 52.

FIG. 3*a* is a top plan view of transducer assembly 28 showing gaps A and B with the remainder of the transducer assembly illustrated in phantom. At the right end of gap A there is a notched portion 54. A similar notched portion 56 is at the left end of gap B. These notches reduce the effective width of each gap by the depth of the notches 54 and 56, respectively. The bracket symbol 58 depicts the effective width of gap A. As a result of the notches, and this is significant in the present invention, the two gaps are offset from one another in a direction parallel to their width. In FIG. 2, notch 56 is represented by a pair of solid lines while notch 54 is represented by a pair of dashed lines, since it is behind the pole pieces 40 and 44.

The servo tracks recorded on disc surface 30 are in the form of concentric tracks which are in vertical alignment with the data tracks on the other surfaces of discs 10. However, for purposes of illustration, these servo tracks are shown to be linear in FIG. 3 (this does not affect the principle involved). One set of alternate servo tracks $n-1$, $n+1$, and so on, have recorded thereon a signal at one frequency *f1* and the other set of alternate servo tracks have recorded thereon a signal at a second frequency *f2.* While not shown, it is to be understood that it is within the scope of the present invention to have a narrow guard band with no recorded information interposed between each adjacent track. It is also within the scope of this invention to record only on every other track so that, for example, only frequencies *f1* may be recorded while no signals are recorded on the tracks labeled *f2.* Then each two tracks on surface 30 would correspond to one data track on the other disc surface. In either case, it is contemplated that the servo information will be factory recorded so that the tracks are accurately positioned. Also in some applications, such as on tape, only a single servo track may be required.

Transducer assembly 28 is of the type in which the signal produced by either of coils 50 or 52 at a given frequency, for example *f2,* is proportional to the width of the portion of the respective gap which is over that track. That is, in FIG. 3*a* equal widths of gap A and gap B are positioned over track *n*, and therefore the *f2* components of the signals appearing at coils 50 and 52 will be equal. In FIG. 3*b*, transducer assembly 28 is shown displaced to the right relative to track *n* (perhaps more accurately the disc and therefore track has moved to the left) so that the same amount of gap A is opposite track *n* as was the case with FIG. 3*a* but only about half as much of gap B is positioned opposite track *n* as was the case with gap B in FIG. 3*a*. Therefore, the *f2* signal picked up at gap A and appearing at coil 50 will be of greater amplitude than the *f2* frequency picked up at gap B appearing at coil 52. As will be described shortly in connection with FIG. 4, this unbalanced signal is fed to a servo circuit which will restore head 28 to its centered position relative to track *n* as indicated in FIG. 3*a*.

In FIG. 3*c*, transducer assembly 28 has moved even further to the right and has reached a position of indecision; that is, both the left portion of gap A and the right portion of gap B are receiving equal amounts of the *f2* signal. Therefore, coils 50 and 52 would produce equal signal amplitudes even though the transducer assembly 28 is not positioned over track *n*, as desired.

At any position of the transducer assembly 28 to the right of the desired *f2* track through a displacement of a half track, the difference signal (A–B) increases proportionally with the displacement. Therefore, this difference signal may be used to drive assembly 28 back toward the desired track. As will also be seen shortly, the same principle applies if the transducer assembly is moved to the left of the desired *f2* track; however, now the gap B picks up more *f2* signal than gap A.

It should be noted that as assembly 28 continues to move to the right of the position shown in FIG. 3*b* to any position up to but not including a one track offset, gap A will produce more *f2* signal than will gap B. However, the difference signal (A–B) decreases with increasing displacement until, as illustrated in FIG. 3*c*, there is no signal difference. Some servo systems require both that there be a difference between the signal magnitudes at the two gaps and that that difference increase as displacement from the desired position increases. (Of course, the direction of that displacement must also be provided.) For this type of servo system, displacement errors of only up to one half a track may be corrected by the present invention. Other servo systems require only that there be a difference in signal from the two gaps to provide correction signals. For this type of system errors of up to but not including one track displacement may be tolerated.

Figure 4:
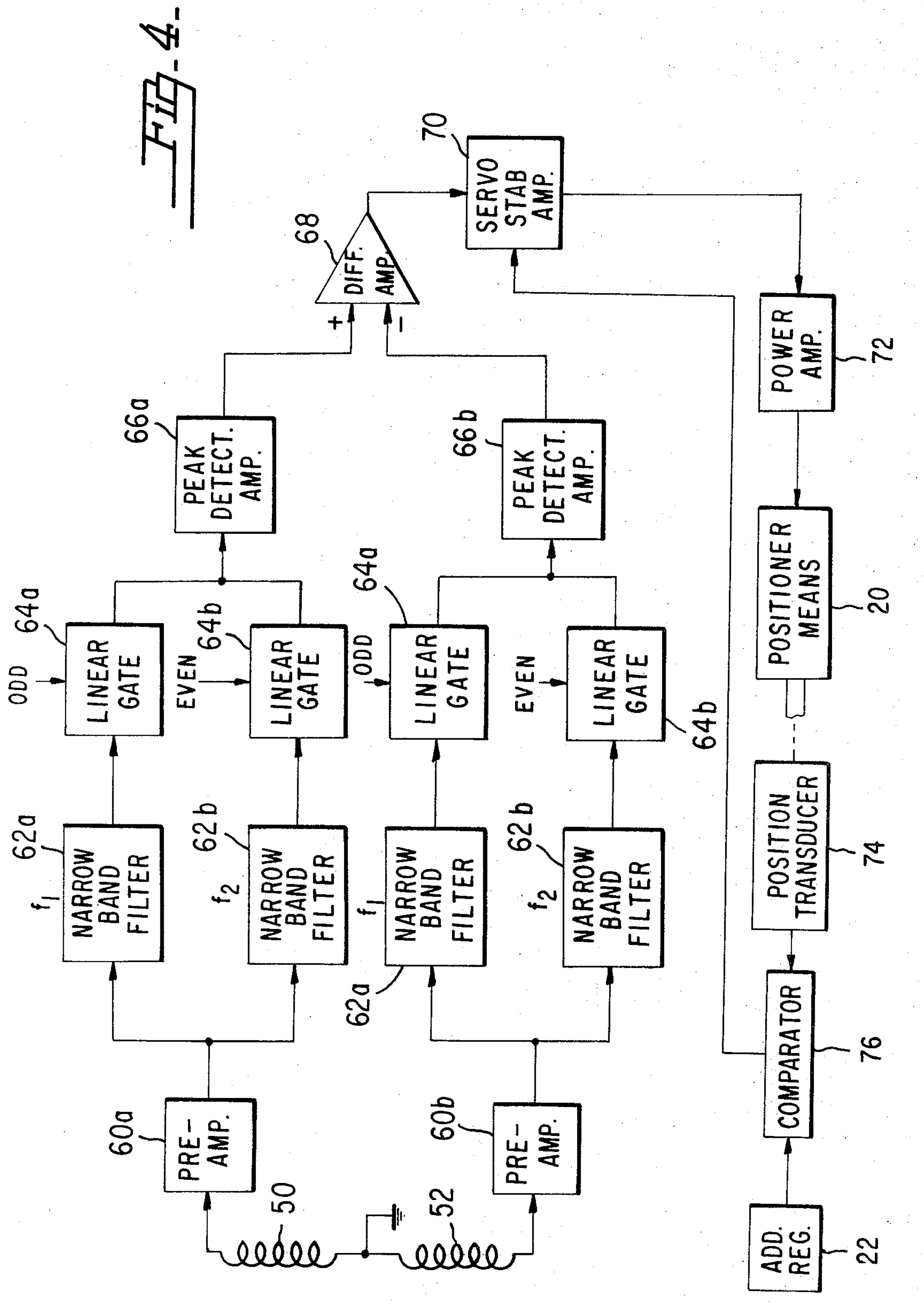
FIG. 4 is a block diagram of a servo system which may be used in the system of FIG. 1.

In FIG. 4, which shows the details of the servo system 26, transducer coils 50 and 52 are connected at one end to a source of reference potential—ground, and their other end to similar preamplifiers **60*a* and 60*b*, respectively. The output of each preamplifier is coupled to two narrow band filters, a first narrow band filter 62*a*,** which passes signals at frequency *f1* and a second narrow band filter **62*b*, which passes signals at frequency *f2.* Filter 62*a* connects to linear gate 64*a* and filter 62*b* to linear gate 64*b*.**

Linear gates **64*a* are responsive to the ODD signal from address register 22 (FIG. 1**) to pass signals at frequency *f1* while linear gates **64*b* are responsive to the EVEN signal from address register 22 to pass signals at frequency *f2.* As either an odd track or an even track will be selected, only one set of linear gates will be enabled (i.e. conditioned to pass signals from an associated filter) at any one time. The linear gates associated with coil 50 are coupled to a peak detecting amplifier 66*a* while the linear gates associated with the coil 52 are coupled to a similar peak detecting amplifier 66*b*.**

Peak detecting amplifiers 66 produce an essentially DC signal corresponding to the peaks of the sine waves detected by coils 50 and 52. The peak detectors have a period equal to about 10 times the period of the frequency which they are detecting so that long term variations in outputs of the two coils such as when the transducer assembly 28 moves to a position not centered over a given track, will cause a variation in output signal. The two peak detectors **66*a* and 66*b* are coupled to differential amplifier 68. Differential amplifier 68 is coupled to a servo stabilization amplifier 70, the purpose of which is to provide adequate gain and phase values for the whole closed loop servo system that will result in the bandwidth and stability required for proper operation of the track following servo. The servo stabilization amplifier is coupled to a power amplifier 72 and the latter is coupled to positioner means 20. A position transducer 74 may be coupled to a movable part of the positioner means to produce signals indicative of the actual nominal location of heads 14** and 28. These signals, along with signals from address register 22 may be coupled to a comparator 76 while the latter is coupled to servo stabilization amplifier 70.

Operation of the system is as follows. The address of the track to which it is desired to move heads 14 is entered into address register 22. This information may come from a manual means or more likely from digital computer means (not shown). Assume that the address is an even address for track *n*. It is compared in comparator 76 with the present head address which is obtainable, for example, from transducer 74 coupled to positioner means 20. If these addresses are unequal, comparator 76 produces an error signal which it applies to amplifier 70. The latter drives the positioner until the error signal reduces to zero, which indicates that the heads are correctly coarsely positioned over track *n*.

Then if transducer assembly 28 is accurately centered on track *n* as illustrated in FIG. 3*a*, coils 50 and 52 will produce signals at frequency *f2* of equal magnitude. Parenthetically, as should be obvious from FIG. 3*a*, the amount of signal at frequency *f1* produced by the two coils will also be of the same magnitude. However, since track *n* is by definition an even track, the EVEN signal will enable gates 64*b* while the absence of the ODD signal causes gates 64*a* to be blocked so that only the *f2* component of the signals received from coils 50 and 52 will reach peak detecting amplifiers 66*a* and 66*b*, respectively. Since the signals received at coils 50 and 52 are of equal magnitude, the output signals from peak detectors 66*a* and 66*b* will also be identical and therefore the output of differential amplifier 68 will be zero so that no correction signal is fed to positioner means 20.

For any one of a number of reasons the transducer head may not be accurately positioned relative to track n. Such mispositioning may be the result of eccentricity of shaft 12 or result from temperature effects causing different expansion amounts of the various mechanical elements making up the system. Further, unless the means for providing current head location information is on the disc surface, the heads may not line up exactly with tracks as recorded on the disc. In any event, if transducer assembly 28 is or becomes positioned to one side of the centered or ideal position such as, for example, the position shown in FIG. 3*b*, an unbalance will exist in the signals produced by the two coils 50 and 52. In the example of FIG. 3*b*, coil 50 will continue to produce the same amount of signal at frequency *f2* while coil 52 will produce a signal only approximately half as great at frequency *f2*. Therefore, peak detecting amplifier 66*a* will produce a signal with a larger magnitude than peak detecting amplifier 66*b*. This difference is manifested by a signal at the output of differential amplifier 68 of the proper polarity and proper magnitude to drive positioner means 20 in the proper direction to restore the transducer assembly and therefore all of transducer heads 14 to the proper location centered on track *n*. Similarly, if transducer assembly 28 becomes positioned to the left of the desired track, *n*, then the resultant greater signal from amplifier 66*b* relative to the signal from amplifier 66*a* will again produce a signal from the differential amplifier 68 of a polarity and magnitude which repositions the transducer assembly 28 and all other transducers 14 to track *n*. Clearly the operation just described works for odd tracks such as track *n*+1 except that the ODD signal enables gates 64*a* (gates 64*b* are blocked) so that only signal components of frequency *f1* are passed to amplifiers 66. Operation is as otherwise described for track *n*.

The circuit of FIG. 4 will correct a positioning error up to (but not including) a head position error of one track from the nominal position or up to one half a track, depending on the servo system. The gap width of both gaps A and B must be such that when the transducer assembly is positioned centered over a given track, the gaps A and B must extend partially into adjoining tracks respectively. That is, shown in FIG. 3*a*, the portion of gap A must extend into track *n*—1 while a portion of gap B must extend into track *n*+1. The gap portions should not, however, extend into the next succeeding track, that is, into track *n*—2 or *n*+2.

As shown in FIGS. 3*a* through 3*c*, gaps A and B overlap by one full track. Such overlap is, however, not necessary. The transducer assemblies illustrated in FIGS. 3*d* through 3*f* have no overlap at all. This arrangement has the advantage of having the signal from gap A increase in value while the signal from gap B decreases in value for the first one half a track displacement (assuming a move from track *n* to track *n*+1). Therefore, the change in signal for small excursions from a position centered on track *n* will produce a greater change in signal than will be the case with the transducer assemblies of FIGS. 3*a* through 3*c* where the signal from gap A stays the same while the signal from gap B decreases. However, of course, the total signal in the assemblies of FIGS. 3*d* through 3*f* will be less. It is therefore a matter of design choice which of the two types one would choose. It should be noted that the gaps need not even meet as shown in FIGS. 3*d* through 3*f* so long as at least some portion of each gap concurrently is over the same track.

The system just described works equally well with only one frequency such as, for example, frequency *f2*. In that case, the odd tracks shown would be blank rather than being recorded at the frequency *f2*; that is, they would have no information recorded on them. In this embodiment, two servo tracks correspond to one data track on the other disc surfaces of discs 10. Further, with only one frequency, the narrow band filters 62 and linear gates 64 are not needed (FIG. 4). Then, preamplifiers 60 are connected directly to peak detecting amplifiers 66. With one frequency, misalignments of up to one half of a normal track (that is a data track) may be corrected for.

If corrections of more than one data track width are required, then the principle outlined is still applicable but more than two frequencies must be employed and additional narrow band filters and linear gates for the additional frequencies must be added to the circuit of FIG. 4.

What is claimed is:

1. In combination:

a movable member having a plurality of side-by-side tracks, each track having a signal impressed thereon at a given frequency, no two adjacent tracks having the same frequency;

means movable in a direction substantially normal to the direction in which said tracks extend, including first and second transducer means, an equal portion of each ideally positioned opposite a selected one of said tracks, the remaining portion of each extending into one and the other opposed adjacent tracks respectively, but which transducer means may be offset from said ideal position in said normal direction, said first and second transducer means producing signals at the frequency of said selected track proportional to the portion of said transducer means opposite said selected track; and means responsive to a difference in said signal level produced by said first transducer means relative to that produced by said second transducer means at the frequency of said selected track for moving said movable means to restore said transducer means to said ideal position.

2. The combination as set forth in claim 1 wherein said movable member comprises a plurality of stacked, spaced apart discs having magnetizable material on the surface thereof, one surface of which has said plurality of tracks, the other surfaces of which have data in tracks corresponding to said plurality of tracks.

3. In combination:

a rotatable disc assembly comprising a plurality of stacked spaced apart discs having magnetic recording surfaces thereon, one such surface having a plurality of circumferential tracks recorded thereon, every other track having a signal recorded at a first frequency an the remaining tracks being recorded at a second different frequency;

a transducer assembly and means for moving said transducer assembly in a direction radial of the disc surface to a position opposite any selected one of said tracks, said transducer assembly comprising two transducer means, each including a high reluctance gap extending in the radial direction and offset from one another in the radial direction so that when said transducer assembly is centered over a track, equal portions of said gaps are opposite said track while the remaining portions extend opposite one and the other adjacent tracks respectively, said transducer means producing signals at any given frequency proportional to the portion of gap opposite a track having that frequency;

means responsive to signals from the transducer means and to an indication of the frequency of a track to be selected for providing signals from each transducer means only at the selected track frequency; and means responsive to said signals at the selected track frequency from each transducer means for producing an error signal indicative of unbalance between the two signals, said error signal being applied to said means for moving said transducer assembly for moving the transducer assembly until it is centered over the selected track and the signal unbalance is eliminated.

4. In combination:

a movable member having a plurality of side-by-side tracks, each track having a signal impressed thereon at a given frequency, no two adjacent tracks having the same frequency;

means movable in a direction substantially normal to the direction in which said tracks extend, including first and second transducer means, an equal portion of each ideally positioned opposite a selected one of said tracks, the remaining portion of each extending into one and the other opposed adjacent tracks respectively, but which transducer means may be offset from said ideal position in said normal direction, said first and second transducer means producing signals at the frequency of said selected track proportional to the portion of said transducer means opposite said selected track;

means responsive to a difference in said signal level produced by said first transducer means relative to that produced by said second transducer means at the frequency of said selected track for moving said movable means to restore said transducer means to said ideal position; and means producing a signal indicating the frequency of the track being selected, wherein said means responsive to a difference in said signal level includes means coupled to said first transducer means responsive to signals therefrom of at least two frequencies and to said signal from said means producing a signal indicating the frequency of the track being selected for producing a signal at only the selected track frequency and includes a similar means coupled to said second transducer means.

* * * * *